United States Patent [19]
Fujisawa et al.

[11] 3,951,790
[45] Apr. 20, 1976

[54] THIURAM POLYSULFIDE HEAVY METAL REMOVER

[75] Inventors: Tamotsu Fujisawa, Yamato; Mitsuko Ambe, Tokyo; Norio Kobayashi; Akiko Osawa, both of Sagamihara; Kiwako Shimizu, Hachioji, all of Japan

[73] Assignee: Sagami Chemical Research Center, Tokyo, Japan

[22] Filed: July 12, 1974

[21] Appl. No.: 488,039

[30] Foreign Application Priority Data
July 20, 1973 Japan.............................. 48-80569

[52] U.S. Cl.................................. 210/38 B; 55/72
[51] Int. Cl.².................................. C02B 1/42
[58] Field of Search .......... 75/101 BE, 121; 260/79; 210/38, 24, 36, 38 B; 423/99, 100, 580; 55/72, 74

[56] References Cited
UNITED STATES PATENTS

| | | | |
|---|---|---|---|
| 3,040,003 | 6/1962 | Beaman | 260/79 |
| 3,213,105 | 10/1965 | Gruber | 260/79 |
| 3,236,816 | 2/1966 | Caldwell | 260/79 |
| 3,240,764 | 3/1966 | Beaman | 260/79 |
| 3,261,816 | 7/1966 | Boogaart | 260/79 |
| 3,428,448 | 2/1969 | Bank | 75/121 |
| 3,448,169 | 6/1969 | Wagner | 260/79 |
| 3,594,355 | 7/1971 | Vandenberg | 260/79 |
| 3,637,574 | 1/1972 | Millen | 260/79 |
| 3,728,103 | 4/1973 | Lishevskaya | 75/121 |
| 3,755,161 | 8/1973 | Yokota | 210/38 |
| 3,796,787 | 3/1974 | Burrows | 423/99 |

OTHER PUBLICATIONS

Hackh's Chemical Dictionary, McGraw Hill Book Co., 1969, p. 678.

Primary Examiner—Charles N. Hart
Assistant Examiner—Ernest G. Therkorn
Attorney, Agent, or Firm—Flynn & Frishauf

[57] ABSTRACT

A polymeric compound having thiuram mono- or poly-sulfide linkage shows noteworthy property for removing and collecting heavy metals from the environment. Especially, said compound can remove mercury, in any form, from the environment effectively. On the other hand, said compound shows ability to selectively recover some kinds of heavy metals by the selection of appropriate conditions.

10 Claims, No Drawings

THIURAM POLYSULFIDE HEAVY METAL REMOVER

BACKGROUND OF THE INVENTION

1. Field of the Invention

The present invention relates to a composition for use as a heavy metal remover and more particularly, the present invention relates to a heavy metal removing composition comprising a polymeric compound having thiuram mono- or poly-sulfide linkage or a mixture thereof. The present invention also relates to a process for removing heavy metals from the environment.

It is well known that public nuisances occurred by the environmental pollution with heavy metals have brought serious social problems. Among them, especially, the poisoning with elemental mercury and compounds thereof are known to show distressing toxic symptoms. Accordingly, it is an important task to establish an effective process for removing heavy metal contaminants from the environment so as to prevent future occurrence of such toxicosis with heavy metals and to clean up the environment already polluted therewith.

The inventors have studied extensively to find an effective way to remove heavy metals and/or compounds thereof from the environment polluted therewith, for example, from solutions and gases, especially from waste water, exhaust gases and the soil already contaminated with, such as agricultural chemicals, and the inventors now found a composition having remarkably high ability to remove heavy metals from the environment, for example, having the ability to reduce mercury concentration contained in a waste water less than 0.02 ppb, and have come to a success in establishing the present invention.

2. Description of the Prior Art

Polymeric compounds having thiuram mono- or poly-sulfide linkage are known and are reported as vulcanization accelerators and bactericides. However, until now, no trial was reported to use said compounds as heavy metal removers to our knowledge. In other words, as far as the inventors know, there is no information about the compounds that they have abilities to remove heavy metals and/or compounds thereof.

SUMMARY OF THE INVENTION

Therefore, an object of this invention is to provide a heavy metal removing composition having extraordinary ability.

Another object of this invention is to provide a composition particularly effective for use as mercury remover.

Still further object of this invention is to provide a process for removing heavy metals, especially mercury, from the environment.

The composition of this invention comprises a polymeric compound having thiuram mono- or poly-sulfide linkage as an indispensable component. In accordance with the present invention, it has been discovered that extraordinary and highly effective results are obtained for heavy metal removal from the environment. In a specific embodiment, it has been found that the composition of this invention shows special affinity for mercury and mercury compounds, and they can reduce mercury concentration below 0.02 ppb. It is to be noted that the value 0.02 ppb is less than the natural abundance of mercury in the ocean.

As stated, polymeric compounds having thiuram mono- or poly-sulfide linkage are, in general, known compounds and they can be synthesized easily, for example, by the oxidation of bis-dithiocarbamates which are obtainable, for example, by the reaction of amines with carbon disulfide.

Illustrations of the thiuram mono- or poly-sulfide compounds which may be used as the heavy metal removers of this invention are, for example, compounds shown by the following general formula

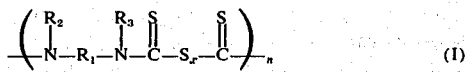

(in the formula, $R_1$ represents an alkylene radical or an arylene radical, $R_2$ and $R_3$ represent, independently, hydrogen, an alkyl radical, an aryl radical, and in some cases, $R_2$ and $R_3$ are combined to form a divalent organic radical and giving ring structure to the compounds, and $x$ and $n$ are positive integers, respectively), compounds shown by the following general formula

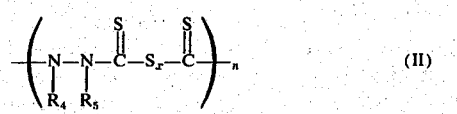

(in the formula, $R_4$ and $R_5$ represent, independently, hydrogen, an alkyl radical or an aryl radical and $x$ and $n$ are positive integers) and compounds shown by the following general formula

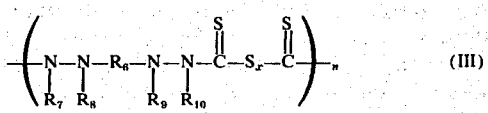

(in the formula, $R_6$ represents an alkylene radical or an arylene radical, $R_7$ and $R_{10}$ represent, independently, hydrogen, an alkyl radical or an aryl radical, $R_8$ and $R_9$ represent, independently, hydrogen, an alkyl radical, an aryl radical, and in some cases, $R_8$ and $R_9$ are combined to form a divalent organic radical and giving ring structure to the compounds, and $x$ and $n$ are positive integers, respectively). The compounds shown by formula I can be prepared from diamines and the compounds shown by the formulae II and III can be prepared rom hydrazines and bishydrazine compounds, respectively. The end group of the compounds is a dithiocarbamate group known as a chelating group and therefore, the existence of such ditiocarbamate group is preferred for the heavy metal removers of this invention. Further, by using triamines in lieu of a part of diamines, cross-linked thiuram mono- or poly-sulfide polymers can be obtained. Said cross-linked polymers can, also, be used as the heavy metal removers of this invention. Also, a polymer having thiuram mono- or poly-sulfide linkages in the side chains or the cross-linking chains can easily be prepared from polymers of a compound having amino group or imino group and the polymers having thiuram mono- or poly-sulfide linkages can also be used as the heavy metal removers of this invention.

The composition of the heavy metal removers of this invention can be varied widely and typical illustrations of the composition are, for example, a polymeric compound having thiuram mono- or poly-sulfide linkage, mixtures of such compounds, a mixture of such compound or compounds with carrier or carriers, such as activated carbon, diatomaceous earth and the like. The heavy metal removers of this invention can be used in any suitable form, such as powder, pills, pellets and granules.

The heavy metal removers of this invention can be used effectively to remove heavy metals in wide pH conditions and, in fact, they can be used under acidic, neutral of basic condition. It is to be noted that affinities of heavy metals with the heavy metal removers of this invention can vary with the change of conditions, and therefore, selective removal of specified heavy metals can be achieved by the selection of appropriate conditions.

The heavy metals which can be removed by the use of the remover of this invention are, for example, Hg, Fe, Cd, Pb, Cr, Cu, As and Zn. Selective removal of specified heavy metals can be carried out by the selection of suitable conditions. For example, removal of ferrous ion of $Fe(NH_4)_2(SO_4)_2$ can be achieved and removal of ferric ion of $Fe_2(SO_4)_3(NH_4)_2SO_4$ in the coexistence of sodium tartrate cannot be achieved, but ferric ion of $FeCl_3$ can be removed.

The heavy metal removers of this invention can react selectively with heavy metals contained in a solution to be treated, however, the removers cannot react with an alkali metal contained in the solution. The reaction products of the heavy metal removers of this invention and heavy metals are, in general, insoluble or sparingly soluble in an aqueous solution, and therefore, the removers can easily be separated and recovered from the treated solution, for example, by a conventional procedure, such as filtration, settling, centrifuge and the like.

The removal of heavy metals and/or compounds thereof from, for example, sea water, waste water and exhaust gas by the use of the heavy metal removers of this invention can be carried out in a conventional way. However, the adoption of a closed system known in the art, such as column system, fixed bed system or fluidized bed system, is preferred.

The heavy metal removers of this invention have the abilities to lower the concentration of the heavy metal contained in a solution to be treated to a significantly low level and therefore, if the concentration of heavy metals contained in the solution to be treated is high, it may be advisable to use multistage treatment such as two or more stages in which one or more stages are treated by conventional way and the final treatment is done by using the heavy metal removers of this invention. As stated hereinbefore, if the metal to be removed is mercury, the concentration of mercury contained in a solution can be lowered to a level of 0.02 ppb or less, adoption of multistage treatment would be recommended.

The heavy metal removal operation by the use of the composition of this invention can be carried out by any process including batch, semi-batch and continuous processes.

We found further that if the solution to be treated contains sodium chloride, the removal of heavy metals can be achieved preferably. Particularly, removal of mercury from sea water under an alkaline condition (pH: around 8.0–12.0) is remarkable.

As stated, by the use of the heavy metal removers of this invention, heavy metals, particularly, mercury in any form including ionic form, i.e. inorganic form, organic form (e.g. alkylmercury compounds) and metallic form, i.e. gas and colloidal forms can easily be removed fully by a simply way from the polluted environment, such as exhaust or vent gas, waste water, river water, sea water and soil.

One of the remarkable features of the remover of this invention is that the significantly high ability to remove mercury is not affected by the coexistence of other metal ions. For example, the remover of this invention can effectively remove mercury from a solution which contains not only mercury but also, Fe, Ni, Mn, Cr, Zn, Cu, Pb, Cd, Ca or Mg. This is a noteworthy advantage of the remover of this invention. Also, one of the other significant features of the remover of this invention is that the high ability to remove mercury is almost not affected by anions such as $Cl^-$, $NO_3^-$ and $SO_4^{--}$ contained in the solution to be treated. The coexistence of complex forming anions, such as $CN^-$, $S_2O_3^{--}$, $S^{--}$ and $I^-$ lowers the mercury removing ability of the remover, in some extent, however, even in this instance, percentage of mercury removal is still higher than 99%. Mercury removers available at present are known sensitive to the presence of complex forming anions and if such anions are existed, the removers give very poor result.

DESCRIPTION OF THE PREFERRED EMBODIMENTS

To further illustrate the various aspects of the present invention, the preferred embodiments thereof, and the advantageous results to be obtained thereby, the following examples are provided.

EXAMPLE 1

Poly(diethylene-thiuramdisulfide) having the following structure

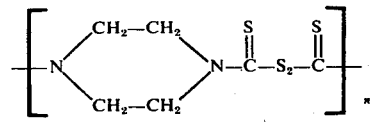

was synthesized by mixing an aqueous solution of bis-potassium-dithiocarbamate derivative of piperadine having the following formula

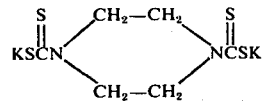

with iodine solution in chloroform under agitation.

Elemental Analysis (%) of the polymer Found: C 30.78, H 3.55, N 11.87; Calculated: C 30.49, H 3.41, N 11.85.

Then, 0.5 g of the polymer thus prepared was put into 100 ml of an aqueous solution of mercuric chloride containing 10 ppb of mercuric ion, and the mixture was kept standing for 1 hour at room temperature. Thereafter, the polymer was filtered off. Mercury ion concentration of the filtrate was measured by using flameless atomic absorption spectrophotometer. When the pH of the aqueous solution to be treated was adjusted to be 2.2 or 7.1, the mercury ion concentration of the filtrate, in both cases, were below the detection limit, i.e. less than 0.02 ppb.

EXAMPLES 2–9

Various amounts of the polymer prepared in Example 1 were added into each 100 ml of aqueous solution of mercuric chloride containing 1000 ppb, i.e. 1 ppm, of mercuric ion under various pH conditions, and the mixtures were kept standing at room temperature for 1 hour. Then, the polymer was filtered off, respectively. Mercury ion concentrations of the filtrates were measured in the same manner as stated in Example 1. The results were summarized in Table 1.

Table 1

| Example No. | pH | Polymer Added (g) | Filtrate $Hg^{++}$ Concentration (ppb) |
|---|---|---|---|
| 2 | 7.0 | 0.1 | 0.1 |
| 3 | 7.0 | 0.2 | 0.06 |
| 4 | 7.0 | 0.3 | 0.03 |
| 5 | 7.0 | 0.5 | 0.05 |
| 6 | 7.0 | 0.8 | 0.04 |
| 7 | 2.8 | 0.3 | 6.0 |
| 8 | 3.1 | 0.5 | 1.7 |
| 9 | 10.7 | 0.5 | 13 |

EXAMPLES 10–13

Various amounts of the polymer prepared in Example 1 were added into each 100 ml of 30.5 per mille aqueous solution of sodium chloride which also contain mercuric chloride in an amount to correspond $Hg^{++}$ ion concentration of 1000 ppb under various pH conditions. Removal of mercuric chloride was carried out in the same manner as explained in Example 1 unless otherwise specified. The results were summarized in Table 2

Table 2

| Example No. | pH | Polymer Added (g) | Filtrate $Hg^{++}$ Concentration (ppb) |
|---|---|---|---|
| 10 | 6.0 | 0.3 | 0.16 |
| 11 | 6.0 | 0.5 | 0.04 |
| 12 | 2.8 | 0.5 | 0.08 |
| 13 | 10.7 | 0.5 | less than 0.02 |

EXAMPLE 14

Poly(ethylene-thiuramtetrasulfide) having the following structure

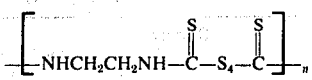

was synthesized from ethylene-bis(sodium dithiocarbamate) and sulfur monochloride. The polymer had decomposition temperature of 127°C.

Elemental Analysis (%) of the polymer: Found: C 16.83, H 2.13, N 10.15, S 67.29; Calculated: C 17.50, H 2.20, N 10.21, S 70.09.

Then, 0.5 g of the polymer thus prepared was added into 100 ml of an aqueous solution of mercuric chloride containing 1 ppm of mercuric ion, and the mixture was kept standing at room temperature for 1 hour. Then, the polymer was filtered off and the mercury ion concentration of the filtrate was measured in the same manner as stated in Example 1. The result was below the detection limit, i.e. less than 0.02 ppb.

EXAMPLE 15

To 20 ml of aqueous solutions of mercuric chloride having predetermined concentrations shown in Table 3, 0.1 g of various kinds of thiuram mono- or poly-sulfide compounds were added, respectively. The mixtures were agitated for a predetermined period shown in Table 3. The mixtures were then filtered and the Hg concentrations of the filtrates were measured, respectively, by EDTA method. The amounts of mercury removed by the operation above were calculated. The conditions used and the results obtained were shown in Table 3.

Table 3

| Run No. | Thiuramsulfide compound (Remover) | Decomposition point of remover (°C)* | $HgCl_2$ concentration in feed (%) | Reaction time (hr) | $Hg^{++}$ absorbed (g/g remover) |
|---|---|---|---|---|---|
| 1 | ${+(CH_2)_2NHC(=S)S_2C(=S)NH+}_n$ | 127 – 131 | 2.5 | 90 | 3.28 |
| 2 | ${+(CH_2)_2NHC(=S)S_3C(=S)NH+}_n$ | 144 | do. | do. | 2.96 |
| 3 | ${+(CH_2)_2NHC(=S)S_4C(=S)NH+}_n$ | 134 – 136 | do. | do. | 3.06 |
| 4 | ${+(CH_2)_4NHC(=S)S_2C(=S)NH+}_n$ | 95 – 100 | do. | do. | 1.64 |
| 5 | ${+(CH_2)_4NHC(=S)S_3C(=S)NH+}_n$ | do. | do. | do. | 1.61 |
| 6 | ${+(CH_2)_4NHC(=S)S_4C(=S)NH+}_n$ | 102 – 104 | do. | do. | 1.56 |
| 7 | ${+(CH_2)_6NHC(=S)S_2C(=S)NH+}_n$ | 90 – 94 | do. | do. | 1.49 |
| 8 | ${+(CH_2)_6NHC(=S)S_3C(=S)NH+}_n$ | 92 – 106 | do. | do. | 1.53 |
| 9 | ${+(CH_2)_6NHC(=S)S_4C(=S)NH+}_n$ | 88 – 107 | do. | do. | 1.60 |
| 10 | $+N\bigcirc NC(=S)S_2C(=S)+_n$ | 158 – 186 | do. | do. | 0.38 |
| 11 | $+NHN\bigcirc NNHC(=S)S_2C(=S)+_n$ | 138 | 1.0 | do. | 1.33 |
| 12 | $+NHNHC(=S)S_2C(=S)+_n$ | 181 | do. | 70 | 1.40 |

*Determined by TGA

EXAMPLE 16

To 100 ml of an aqueous solution of mercuric chloride containing 1000 ppb of $Hg^{++}$ ion, a predetermined amount (shown in Table 4) of the remover of this invention was added. The mixture was kept standing for a predetermined time (shown in Table 4) and then the mixture was filtered. The Hg concentration of the filtrate was measured by using flameless atomic absorption spectrophotometer. The conditions used and the results obtained were shown in Table 4.

Table 4

| Run No. | Remover Formula | Added amount (g) | Contact Time (min.) | Hg concentration of the filtrate (ppb) |
|---|---|---|---|---|
| 1 | $+(CH_2)_2NHC(=S)S_2C(=S)NH+_n$ | 0.3 | 30 | 0.07 |
| 2 | $+(CH_2)_2NHC(=S)S_3C(=S)NH+_n$ | do. | do. | 0.13 |
| 3 | $+(CH_2)_2NHC(=S)S_4C(=S)NH+_n$ | do. | 15 | 0.05 |
| 4 | do. | 0.5 | do. | less than 0.02 |
| 5 | $+(CH_2)_4NHC(=S)S_2C(=S)NH+_n$ | do. | 60 | 0.02 |
| 6 | $+(CH_2)_4NHC(=S)S_3C(=S)NH+_n$ | do. | do. | less than 0.01 |
| 7 | $+(CH_2)_4NHC(=S)S_4C(=S)NH+_n$ | do. | do. | 0.01 |
| 8 | $+(CH_2)_6NHC(=S)S_2C(=S)NH+_n$ | do. | do. | 0.06 |
| 9 | $+(CH_2)_6NHC(=S)S_3C(=S)NH+_n$ | do. | do. | less than 0.01 |
| 10 | $+(CH_2)_6NHC(=S)S_4C(=S)NH+_n$ | do. | do. | 0.06 |
| 11 | $+N\bigcirc NC(=S)S_2C(=S)+_n$ | do. | do. | 0.04 |

EXAMPLE 17

To 100 ml of aqueous solutions of mercuric chloride containing 1 ppm of mercuric ion, various kinds of metal chloride were added as shown in Table 5 and the pH of the solutions were adjusted between 5 and 6. Then, 0.3 g of poly(ethylenethiuramtetrasulfide) was added into the solution, respectively. The mixtures were kept standing for 1 hour. Thereafter, the mixtures were filtered and the mercury concentration of the filtrates were measured, respectively. The conditions used and the results obtained were given in Table 5.

Table 5

| Run No. | Metal Ion Added | Concentration | Mercury Concentration After Treatment |
|---|---|---|---|
| 1 | $Fe^{3+}$ | 5 (ppm) | 0.6 (ppb) |
| 2 | $Fe^{3+}$ | 50 | 0.6 |
| 3 | $Fe^{2+}$ | 10 | 0.4 |
| 4 | $Mn^{2+}$ | 10 | 0.9 |
| 5 | $Ni^{2+}$ | 10 | 0.45 |
| 6 | $Cr^{6+}$ | 2 | 0.45 |
| 7 | $Cr^{3+}$ | 10 | 1.1 |
| 8 | $Zn^{2+}$ | 10 | 0.35 |
| 9 | $Cu^{2+}$ | 10 | 0.45 |
| 10 | $Pb^{2+}$ | 10 | 0.4 |
| 11 | $Cd^{2+}$ | 5 | 0.4 |
| 12 | $Ca^{2+}$ | 0.1% | 0.6 |
| 13 | $Ca^{2+}$ + $MgSO_4$ | 0.1% + 0.05% | 0.6 |

From the results shown above, it is apparent that the significantly high ability for removing mercury of the remover of this invention is not affected by the coexistence of other metal ions.

EXAMPLE 18

To 100 ml of 30.5 per mille aqueous solutions of sodium chloride which also contain mercuric chloride in an amount to correspond 1 ppm of mercuric ion, various kinds of salts were added in a predetermined amount as shown in Table 6. The pH of the solutions were adjusted to 10 by using NaOH aqueous solution. Then, 0.3 g of poly(ethylenethiuramtetrasulfide) was added into the solutions, respectively. The mixtures were kept standing for 30 minutes. Thereafter, the mixtures were filtered and the mercury concentration of the filtrates were measured, respectively. The conditions used and the results obtained were shown in Table 6.

Table 6

| Run No. | Salt Added Name | Concentration | Mercury Concentration After Treatment |
|---|---|---|---|
| 1 | KCN | $CN^-$ 25 ppm | 2.42 ppb |
| 2 | $Na_2S$ | $S^{2-}$ 20 | 1.33 |
| 3 | $Na_2S_2O_3$ | $S_2O_3^{2-}$ 20 | 2.40 |
| 4 | KI | $I^-$ 20 | 0.95 |
| 5 | $NaNO_3$ | 3% (as salt) | 0.19 |
| 6 | $NaSO_4 \cdot 10H_2O$ | 6% (do.) | 0.04 |

EXAMPLE 19

To 100 ml of 30.5 per mille aqueous solutions of sodium chloride which also contain mercuric chloride in an amount to correspond 1 ppm of mercuric ion, various kinds of salts were added in a predetermined amount as shown in Table 7. The pH of the solutions were adjusted to 10 by using NaOH aqueous solution. Then, 0.3 g of poly(ethylenethiuramdisulfide) was added into the solutions, respectively. The mixtures were kept standing for 30 minutes. Thereafter, the mixtures were filtered and the mercury concentration of the filtrates were measured, respectively. The conditions used and the results obtained were summarized in Table 7.

Table 7

| Run No. | Salted Added Name | Concentration | Mercury Concentration After Treatment |
|---|---|---|---|
| 1 | KCN | $CN^-$ 25 ppm | 1.07 ppb |
| 2 | $Na_2S$ | $S^{2-}$ 20 | 4.75 |
| 3 | $Na_2S_2O_3$ | $S_2O_3^{2-}$ 20 | 2.85 |
| 4 | KI | $I^-$ 20 | 0.95 |
| 5 | $NaNO_3$ | 3% (as salt) | 0.07 |
| 6 | $NaSO_4 \cdot 10H_2O$ | 6% (do.) | 0.026 |

Informations given in Examples 18 and 19 show clearly that the high ability for removing mercury of the remover of this invention is almost not affected by the coexistence of various kinds of anions.

EXAMPLE 20

In this example, 1.0 g of the polymer prepared in Example 1 was added into 10 ml of 20 ppm ethyl mercuric chloride solution in tetrahydrofuran and the mixture was kept standing at room temperature for 1 hour. Then, the polymer was filtered off. The filtered cake was washed with a large amount of tetrahydrofuran. Then, the filtrate and washings were combined. The combined solution was, then, concentrated by evaporating the tetrahydrofuran to give c.a. 0.1 ml solution. The concentrated solution of ethyl mercuric chloride thus obtained was analyzed by gas chromatography (FID) and the ethyl mercuric chloride concentration was found as below the detection limit, i.e. less than 1 ppm.

EXAMPLE 21-23

To 100 ml of water containing colloidal mercury which was prepared by bubbling air to a mixture of water and metallic mercury, there was added 0.5 g of the polymer prepared in Example 1 and the mixture was kept standing at room temperature of 1 hour. By the operation, colloidal mercury was removed effectively. The conditions used and the results obtained were shown in Table 8.

Table 8

| Example No. | Hg Concentration Before Treating (ppb) | pH | Hg Concentration After Treating (ppb) |
|---|---|---|---|
| 21 | 910 | 6.4 | 5.6 |
| 22 | 910 | 2.5 | 3.5 |
| 23 | 910 | 11.4 | 14 |

EXAMPLES 24-26

To 100 ml of water containing 30.5 per mille of sodium chloride and colloidal mercury which was prepared by bubbling air to a mixture of an aqueous solution of sodium chloride (30.5 per mille) and metallic mercury, 0.5 g of the polymer prepared in Example 1 was added and the mixture was kept standing at room temperature for 1 hour. The conditions used and the results obtained by the operations above were shown in Table 9

Table 9

| Example No. | Hg Concentration Before Treating (ppb) | pH | Hg Concentration After Treating (ppb) |
|---|---|---|---|
| 24 | 1100 | 6.4 | 0.14 |
| 25 | 1100 | 2.4 | 0.17 |
| 26 | 1100 | 11.2 | 0.12 |

EXAMPLE 27

Mercury vapor obtained by evaporating metallic mercury in a 260 ml vessel at 25°C for 2.0 minutes was passed to a column filled with 0.5 g of poly(ethylenethiuramtetrasulfide) by using nitrogen as carrier gas. The effluent obtained from the column was trapped by a $KMnO_4 - H_2SO_4$ solution and then, the amount of mercury contained in the $KMnO_4 - H_2SO_4$ solution was measured. The results were shown in Table 10.

Table 10

| | Hg contained in the solution (μg) | Hg absorbed with the polymer (μg) | Percent of removal (%) |
|---|---|---|---|
| Blank Test* | 7.9 | | |
| First Run** | 1.1 | 6.8 | 86 |
| Second Run** | 0.52 | 7.4 | 94 |
| Third Run** | 0.92 | 7.0 | 89 |

*Poly(ethylenethiuramtetrasulfide) was not used.
**These three runs were carried out by using the same column.

EXAMPLE 28

Into 100 ml of a 2.0 ppm cupric sulfate solution in water, 0.3 g of poly(ethylenethiuramdisulfide) was added and the mixture was kept standing at room temperature for 1 hour. Then, the mixture was filtered and found that the cupric ion concentration of the filtrate was 0.03 ppm.

EXAMPLE 29

Into 100 ml of an aqueous solution containing 10 ppm of ferric chloride and 3% of sodium chloride, 0.3 g of poly(ethylenethiuramdisulfide) was added. The mixture was kept standing at room temperature for 1 hour. Then, the mixture was filtered. The ferric ion concentration of the filtrate was less than 0.1 ppm.

EXAMPLE 30

To 100 ml of aqueous solutions containing cupric chloride, cadmium (II) chloride or lead (II) chloride in a predetermined amount (shown in Table 11), 0.3 g of poly(ethylenethiurampolysulfide) shown in Table 11 was added, respectively, under various pH conditions shown in Table 11. The mixtures were allowed to stand for 30 minutes and the mixtures were filtered. The filtrates were acidified strongly and metal ion concentration of the filtrates were measured by using atomic absorption spectrophotometer. The conditions used and the results obtained were shown in Table 11.

Table 11

| | | Metal to be removed Concentration | | |
|---|---|---|---|---|
| Remover | pH | Name | Before Treatment (ppm) | After Treatment (ppm) |
| Poly(ethylene- thiuram- tetrasulfide) | 6.2 | $Cu^{2+}$ | 2.0 | less than 0.02 |
| | 3.3 | $Cd^{2+}$ | 0.5 | less than 0.01 |
| | 5.5 | $Pb^{2+}$ | 10 | 1.51 |
| Poly(ethylene- thiuram- disulfide) | 6.2 | $Cu^{2+}$ | 2.0 | 0.03 |
| | 3.3 | $Cd^{2+}$ | 0.5 | 0.11 |
| | 5.5 | $Pb^{2+}$ | 10 | 3.56 |

EXAMPLE 31

To 100 ml of aqueous solutions containing various kinds of heavy metal chlorides in a predetermined amount (shown in Table 12), 0.3 g of poly(ethylenethiuramtetrasulfide) was added, respectively, under various pH conditions of between 5 and 6. The mixtures were allowed to stand for 30 minutes and the mixtures were filtered. The heavy metal concentrations of the filtrates were measured by using atomic absorption spectrophotometer. Percent removal of heavy metals were calculated. The conditions used and the results obtained were given in Table 12.

Table 12

| Run No. | Heavy Metal ion | Heavy metal ion concentration in feed | Per cent removal of heavy metal |
|---|---|---|---|
| 1 | $Fe^{3+}$ | 5 ppm | 100% |
| 2 | $Fe^{3+}$ | 10 | 99% |
| 3 | $Cd^{2+}$ | 5 | c.a. 70% |
| 4 | $Pb^{2+}$ | 10 | c.a. 50% |
| 5 | $Cr^{2+}$ | 10 | c.a. 40% |
| 6 | $Cu^{2+}$ | 10 | c.a. 30% |
| 7 | $Zn^{2+}$ | 10 | Not removed |

EXAMPLE 32

To 100 ml of aqueous solutions containing 1.5 g of various kinds of heavy metal salts shown in Table 13, a predetermined amount of poly(ethylenethiuramtetrasulfide) was added, respectively, under pH conditions shown in Table 13. The mixtures were allowed to stand for 24 hours. Then, the mixtures were filtered and the concentrations of heavy metals contained in the filtrates were measured, respectively by EDTA method. The amounts of heavy metals removed by the operation above were calculated. The conditions used and the results obtained were shown in Table 13.

Table 13

| Run No. | Salt Added. | Metal Ion Removed | pH | Amount of Heavy Metal Removed g/g Polymer | mole/polymer 1 unit |
|---|---|---|---|---|---|
| 1 | $Fe(NH_4)_2(SO_4)_2 \cdot 6H_2O$ | $Fe^{2+}$ | 4 | 0.0093 | 0.046 |
| 2 | $Fe_2(SO_4)_3(NH_4)_2SO_4 \cdot 24H_2O$* | $Fe^{3+}$ | 2 | 0 | 0 |
| 3 | $CuSO_4 \cdot 5H_2O$ | $Cu^{2+}$ | 3 | 1.19 | 5.15 |
| 4 | $ZnSO_4 \cdot 7H_2O$ | $Zn^{2+}$ | 4 | 0.44 | 1.86 |
| 5 | $PbCl_2$ | $Pb^{2+}$ | 4 | 2.00 | 2.65 |
| 6 | $As_2O_3$ | $As^{3+}$ | 4 | 0.22 | 0.80 |

*10 ml of 10% aqueous solution of sodium tartrate was presented as a masking agent.

From the results shown in Examples 30–32, it is apparent that the remover of this invention is effective to remove various kinds of heavy metals from the environment. Further, it is also understood from the results shown above that selective removal of specified heavy metals can be achieved by the selection of suitable conditions.

Although, the use of a monomericthiuramsulfide compound is not within the scope of this invention for the reason that the results obtained by the use of such monomeric compound were not so significant when compared to those obtained in this invention, following examples are given only for reference purposes.

EXAMPLE 33

In this example, 0.5 g of tetramethylthiuramdisulfide commercially obtained was added into 100 ml of an aqueous solution of mercuric chloride containing 1 ppm of mercuric ion under nearly neutral condition, and the mixture was kept standing at room temperature for 1 hour. Then, the mixture was filtered. The mercury ion concentration of the filtrate was 4.2 ppb.

EXAMPLE 34

Into 100 ml of an aqueous solution of mercuric chloride containing 1 ppm of mercuric ion, 0.5 g of tetramethylthiurammonosulfide commercially obtained was added under nearly neutral condition. The mixture was kept standing at room temperature for 1 hour. The mixture was, then, filtered, and the mercury ion concentration of the filtrate was found as 11 ppb.

we claim:

1. A process for removing a heavy metal or a mixture thereof from an environment containing the same which comprises contacting said environment with a polymeric compound of the formula

　　　(I)

wherein $R_1$ represents an alkylene radical or an arylene radical, $R_2$ and $R_3$ represent, independently, hydrogen, an alkyl radical, an aryl radical, and in some cases, $R_2$ and $R_3$ are combined to form a divalent organic radical and giving ring structure to the compound, $x$ is 2, 3 or 4, and $n$ is an integer identifying the number of units in said polymeric compound.

2. The process of claim 1 wherein the heavy metal is mercury, and said environment is so contacted with said polymeric compound in the presence of sodium chloride under an alkaline condition.

3. The process of claim 2 wherein said environment is an aqueous solution.

4. The process of claim 1, wherein said environment is a polluted water.

5. The process of claim 1, wherein said environment is a gas.

6. The process of claim 1, wherein said polymeric compound is a poly(ethylene-thiuramdisulfide) of the formula

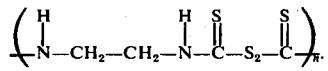

7. The process of claim 1, wherein the heavy metal is mercury and said polymeric compound is a poly(diethylene-thiuramdisulfide) of the formula

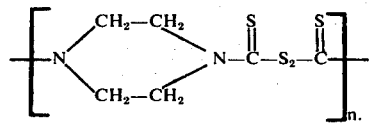

8. The process of claim 1 wherein the heavy metal is mercury.

9. The process of claim 1 wherein the heavy metal is selected from the group consisting of mercury, iron, cadmium, lead, chromium, copper, arsenic, zinc and a mixture thereof.

10. The process of claim 1 wherein said polymeric compound is a poly(diethylene-thiuramdisulfide) of the formula

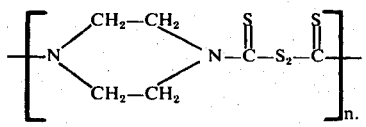

* * * * *